3,463,817
PROCESS FOR PRODUCING AMINE OXIDES
Henry Mahnken, West New York, N.J., assignor to Millmaster Onyx Corporation, New York, N.Y., a corporation of New York
No Drawing. Filed Apr. 18, 1967, Ser. No. 631,604
Int. Cl. C07c *135/02*
U.S. Cl. 260—583                               6 Claims

ABSTRACT OF THE DISCLOSURE

This relates to the preparation of amine oxides by the reaction of tertiary aliphatic amines having an aliphatic gorup of at least 18 carbon atoms, with hydrogen perioxide in aqueous composition, wherein the amine, water and chelating agent are initially heated to a temperature above 80° C., at which time an approximately stoichiometric amount of the hydrogen peroxide is added to the mixture. There is then an exothermic reaction during which the temperature rises and gelling begins to take place. The gel then spontaneously breaks down at approximately 100° C., and the product remains fluid as it cools until, at about 60° C., it would ordinarily begin to set as a viscous paste. However, in order to avoid this paste formation, a small amount of a salt is added at a temperature of about 105°–60° C., which is the temperature at which it is still fluid. The salt is added in an amount of about 0.25–4% by weight of the mixture, and, preferably, about 1% by weight. This serves to maintain tht fluidity of the mixture until it reaches about room temperature, at which time, it sets to a mobile dispersion.

---

This invention relates to the preparation of amine oxides, and it particularly relates to the preparation of amine oxides of tertiary aliphatic amines by the reaction of the amines with hydrogen peroxide.

The tertiary amines utilized in the present invention are preferably those having two lower alkyls, preferably methyl or ethyl and a higher alkyl of 18 to 22 carbon atoms attached to the nitrogen atom.

Prior processes have been utilized wherein the amine was reacted with very dilute aqueous hydrogen peroxide solutions, the hydrogen peroxide solutions being dilute in order to avoid gelling of the reaction mixture into a thick paste long before the reaction is complete, which would make effective agitation and uniform control of the reaction temperature impossible. This type of process was commercially unsatisfactory because the rate of reaction was too slow and it was difficult to achieve anything approaching complete conversion of the amine to the amine oxide.

In order to utilize more concentrated peroxide solutions, such as the 20 to 90% solutions that are commercially available, it was proposed to gradually add the concentrated peroxide solution to the amine, under agitation, at 40 to 80° C., continuing the agitation and maintaining the temperature of the mixture within this range until substantially complete conversion to the oxide was effected. However, this process was successful only when employing amines which had been freshly distilled since impurities present in the commercially availabe amines reduced the peroxide efficiency in the amine oxide reaction below tolerable levels.

It was then proposed to utilize the last-mentioned method, but to avoid the necessity of distillation or redistillation to purify the amine, by adding to the reaction mixture a small amount of diethylenetriaminepentaacetic acid (DTAP) or one of its water-soluble salts, such as its ammonium or alkali metal salt, this compound acting as a chelating agent which would prevent peroxide decomposition. In accordance with the latter practice, only DTAP could be used, other chelating agents not being considered to be satisfactory. Moreover, the temperature of the reaction still had to be retained at no higher than 80° C. and constant agitation was still necessary. This required constant cooling, externally, and the addition, internally, of water to keep it sufficiently fluid to permit agitation. This resulted not only in the necessity of constant attention and additional treating apparatus, but also resulted in an overly lengthy treating period. In addition, it was found, in practice, that only those tertiary amines that had a relatively short higher alkyl chain, such as dodecyl dimethylamine, could be effectively utilized, since the longer chain amines would gel too rapidly at these temperatures. Nevertheless, it was believed that higher temperatures could not be used because of the apparent tendency of both the perioxide and the amine oxide to decompose at temperatures above 80° C., with attendant objectionable yellow color development.

It was then discovered that if an aqueous mixture of the teritiary amine and the chelating agent is heated to a temperature above 80° C. and the hydrogen peroxide is then added above that temperature, there is no deterioration and the product retains its fluidity until setting to a paste at about room temperature. Furthermore, it was discovered that this reaction not only permitted the use of chelating agents other than DTPA but also permitted the use of tertiary amines having aliphatic chains longer than dodecyl.

When the aliphatic chains in the tertiary amines contained up to 16 carbon atoms, the mixture remained fluid, and, therefore, workable and pumpable, down to the paste formation at about room temperature. However, when the aliphatic chain contained 18 or more carbon atoms, the mixture began to turn viscous at about 60° C. This necessitated its storage at about 60° C. or above so that it could be transferred by pumping. As a result of this warm storage, serious discoloration often occurred.

In accordance with the present invention, a process is utilized wherein the reaction is conducted above 80° C., more specifically, between about 85–115° C. No cooling is required, the temperature being allowed to rise at will. Tertiary amines having an alkyl chain between 18 and 22 carbon atoms may be used, and chelating agents other than DTPA may also be effective. The chelating agent may be used in very small amounts, i.e. from about 0.01 to about 3% by weight relative to the amine. In order to maintain fluidity throughout the reaction down to about room temperature, a small amount of a salt is added as the mixture begins to cool. This addition takes place between about 105°–60° C., the salt being added in an amount of about 0.25–4% by weight of the mixture, and preferably, about 1% by weight.

The above is accomplished by first heating a mixture of the concentrated aqueous mixture of the tertiary amine and the chelating agent to a temperature higher than 80° C., and, thereafter, preferably at a temperature just below 90° C., adding the hydrogen peroxide. The temperature is then initially maintained at about 90° C. until it begins to rise spontaneously. As it rises, the mixture is converted to a gel and then at about 105° C., it spontaneously thins out and becomes fluid. Thereafter, as the mixture begins to cool, the salt is added at some point between 105°–60° C.

The salts which have been found to be effective for the present purpose are (1) those having a cation from Group I of the Periodic Table, such as sodium and potassium, and a poly-basic acid anion having oxygen therein, such as sulfate, phosphate, tripolyphosphate, carbonate, etc., there being at least two Group I atoms or one Group I atom and no more than one hydrogen, and (2) those having a cation from Group II of the Periodic Table, such as magnesium, calcium and zinc, and a non-oxygenated anion, such as a halogen. Ammonium may be also substituted for the alkali metals of Group I.

Among the salts found to be particularly effective are sodium sulfate, sodium tripolyphosphate, disodium phosphate, sodium bicarbonate, potassium sulfate, magnesium chloride, calcium chloride and potassium carbonate. Other salts that may be used are ammonium sulfate, sodium pyrophosphate, potassium pyrophosphate and zinc chloride. As it cools, the product remains fluid until about room temperature, at which temperature it becomes a paste.

The following examples are illustrative of the present invention, but are not intended to limit said invention except as claimed:

Example 1

| Components | Amounts in lbs. |
|---|---|
| Stearyl dimethylamine (at equivalent weight 311 by titration, 4.66 mols) | 1,448 |
| Filtered water | 3,300 |
| Hydrogen peroxide (35% aq. sol.) (at 34.4% titrated, 0.518 mols) | 510 |
| Trisodium salt of ethylene diamine tetraacetic acid (EDTA) | 1.5 |
| Sodium sulfate | 53 |

The amine, water and chelating agent were charged into a 2,000 gallon closed kettle fitted with an agitator and a jacket for heating and cooling. During the charging, steam was applied and, at 88° C., the hydrogen peroxide was added during the course of about three-quarters of an hour. It was necessary to apply more heat during the next half-hour to maintain a temperature of about 90° C. At the end of this half-hour interval, the surface of the charge appeared to be blue at the periphery and the temperature rose spontaneously to about 104.5° C.

Gradually the mass turned viscous and grayish until, twenty minutes later, it became a gel that was no longer stirrable, and with some ebullition. This gel phase lasted about one hour, after which the gel dissolved and, finally, after a further one-half hour, became completely fluid with only a little foam which soon broke.

The mixture was then permitted to cool until, when it reached about 70° C., the sodium sulfate was added.

As cooling continued down to room temperature the product remained fluid.

Example 2

The identical components and process were used as in Example 1 except that diethylenetriaminepentaacetic acid (DTPA) was substituted for the EDTA as the chelating agent. The results were substantially identical to those in Example 1.

Example 3

The identical components and process were used as in Example 1 except that sodium chloride was substituted for the sodium sulfate. The results were substantially identical to those in Example 1.

Example 4

The identical components and process were used as in Example 1 except that magnesium chloride was substituted for the sodium sulfate. The results were substantially identical to those in Example 1.

It is to be understood that although the hydrogen peroxide is preferably used in at least stoichiometric amounts, but generally not above 10% by weight excess, other concentrations of the hydrogen peroxide may be used by adjusting the amounts of water in the charge.

Obviously, many modifications of the present invention are possible in the light of the above teachings. It is, therefore, to be understood that the invention may be practiced otherwise than as specifically described.

The invention claimed is:

1. A method of producing amine oxides by the reaction of (1) a tertiary amine having two lower alkyls and a higher alkyl of at least 18 carbon atoms attached to the nitrogen atom and (2) aqueous hydrogen peroxide, which comprises mixing said tertiary amine with water and a chelating agent selected from the group consisting of aminoacetic acid compounds and salts thereof, heating the mixture to a temperature above 80° C., adding at least a stoichiometric amount of the aqueous hydrogen peroxide, permitting the temperature to rise exothermically while the mixture becomes gelatinous, then permitting the exothermic reaction to continue until the mixture again becomes fluid, thereafter cooling the mixture, and then adding a salt to the mixture while it is still fluid, said salt being added in a proportion of about 0.25–4% by weight of the mixture and being either (1) the combination of a cation from Group I of the Periodic Table and an oxygenated polybasic acid anion selected from the group consisting of sulfate, phosphate, tripolyphosphate and carbonate, wherein there are either at least two Group I atoms or one Group I atom and one hydrogen, or (2) the combination of a cation from Group II of the Periodic Table and a halogen.

2. The method of claim 1 wherein the salt is selected from the group consisting of sodium sulfate, sodium tripolyphosphate, disodium phosphate, sodium bicarbonate, potassium sulfate, magnesium chloride, calcium chloride, potassium carbonate, ammonium sulfate, sodium pyrophosphate, potassium pyrophosphate, and zinc chloride.

3. The method of claim 1 wherein the salt is added at a temperature between about 105°–60° C.

4. The method of claim 1 wherein the mixture is cooled to about room temperature.

5. The method of claim 1 wherein the chelating agent is used in an amount of from about 0.01 to about 3% by weight relative to the amine.

6. The method of claim 1 wherein the reaction of the entire mixture is conducted at a temperature of about 85–115° C.

References Cited

UNITED STATES PATENTS 3,047,579 7/1962 Witman.
3,283,007 11/1966 Chadwick.

CHARLES B. PARKER, Primary Examiner

R. L. RAYMOND, Assistant Examiner